United States Patent Office 2,833,779
Patented May 6, 1958

2,833,779
SUBSTITUTED PYRAZOLES

Thomas L. Fields, Pearl River, N. Y., and Martin J. Weiss, Oradell, and William B. Wright, Jr., Woodcliff Lake, N. J., assignors to American Cyanamid Company, New York, N. Y., a corporation of Maine No Drawing. Application October 29, 1956
Serial No. 618,691

12 Claims. (Cl. 260—296)

This invention relates to new substituted pyrazoles. More particularly, it relates to 1,3,5-trisubstituted pyrazoles and methods of preparing the same.

It is known to prepare 1-phenyl-3-(2-thienyl)-pyrazoline (Chem. Abstracts 36, page 1914) and also the corresponding 4-methyl derivative thereof (Chem. Abstracts 33, page 5856). The preparation of the pyridyl-pyrazoles of the present invention, however, has not been described heretofore in the chemical literature.

The compounds of the present invention may be illustrated by the following general formula:

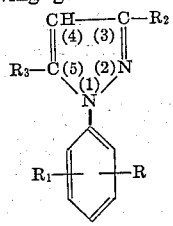

in which R is a halogen, hydroxy, or an alkoxy radical, $R_1$ is hydrogen or a halogen, lower alkoxy, or alkyl radical, and $R_2$ and $R_3$ are lower alkyl or pyridyl radicals, one of which is a pyridyl radical and the other is a lower alkyl radical. For example, the various radicals attached to the nitrogen in the (1) position on the pyrazole ring can be chlorophenyl, bromophenyl, dichlorophenyl, dibromophenyl, chloromethoxyphenyl, chloroethoxyphenyl, bromomethoxyphenyl, bromoethoxyphenyl, chloromethylphenyl, chloroethylphenyl, bromomethylphenyl, bromoethylphenyl, methoxyphenyl, hydroxyphenyl, etc.

The compounds of the present invention are generally solids, although some are oils. They are relatively more soluble in organic solvents, such as ethanol, acetone, ethyl acetate, benzene, or chloroform, than in water. In the form of their salts, they are water soluble in varying extent. The salts are ordinarily crystallizable from alcohol and are insoluble in ether, benzene, chloroform, and the like.

The present compounds are preferably prepared by reacting a pyridyl beta-dicarbonyl compound with a monosubstituted hydrazine. The reaction which takes place can be illustrated by the following equation:

As shown above, the $R_2$ substituent can be in the 3- or 5-position on the pyrazole ring, which is also true of the pyridyl substituent, depending on the manner in which the ring is condensed.

The process of the present invention can be carried out under acidic, neutral, or basic conditions in aqueous solution. It can also be carried out in solvents such as ethanol, methanol, propanol, benzene, toluene, etc. The temperature within which the reaction may be carried out will vary from about 20° C. to about 200° C.

In carrying out the reaction, the two reactants are dissolved together in a solvent such as ethanol and the solution is warmed to a temperature of from about 70° to 100° C. for a period of from one to 20 hours. After cooling the reaction mixture, the product may crystallize or may be distilled. As an aid to crystallization, it sometimes is desirable that the reaction mixture be concentrated and then cooled. The use of acid has a catalyzing effect, and the desired product is obtained as the crystalline acid addition salt.

The present process can be carried out in two steps, wherein the beta-dicarbonyl compound is reacted with a monosubstituted hydrazine to produce an intermediate hydrazone. The intermediate is then cyclized by heating, preferably in the presence of acid, which catalyzes the reaction.

The compounds of the present invention have been found to have analgesic activity when tested by the method described in J. Pharm. Exptl. Therap. 80, 300–307, and modified in J. Pharmacol. Exptl. Therap. 98, 121–137. The activity in many instances was found to be equal to that of Demerol, a synthetic, clinically useful analgesic drug. This potency is markedly superior to that of mild analgesic drugs such as aspirin. The present compounds, therefore, are useful in the relief of pain. They can be given in the form of pills, tablets, powders, liquids, and other well-known methods of administering drugs.

The following examples illustrate the preparation of compounds of the present invention.

EXAMPLE 1

*1 - (p - chlorophenyl) - 3(and 5)-methyl-5(and 3)-(4 pyridyl)-pyrazoles*

A mixture of 16.4 parts of isonicotinoylacetone, 17.9 parts of p-chlorophenylhydrazine hydrochloride, 4.8 parts by volume of 4.2 N alcoholic hydrogen chloride, and 160 parts of ethanol is heated at reflux for five hours and then cooled. The precipitate is filtered off and then recrystallized from ethanol. The crystalline product is converted to the base by treatment with dilute ammonium hydroxide and the base is recrystallized from hexane. Isomer I melts at 90°–91° C.

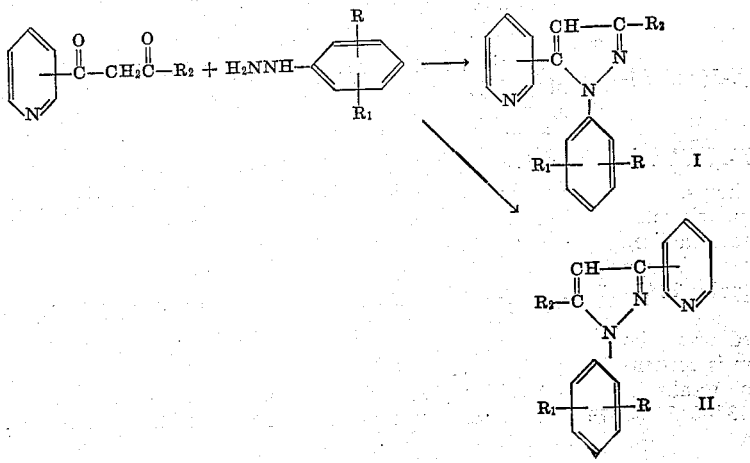

The ethanolic filtrate from the first filtration is concentrated to dryness and the residue is treated with dilute ammonium hydroxide. The insoluble portion is recrystallized from hexane until pure isomer II, melting point 117°–118° C. is obtained.

EXAMPLE 2

*1-(m-chlorophenyl)-3(and 5)-methyl-5(and 3)-(4-pyridyl)-pyrazoles*

A mixture of 16.4 parts of isonicotinoylacetone, 14.3 parts of m-chlorophenylhydrazine, 28.8 parts by volume of 4.2 N alcoholic hydrogen chloride, and 160 parts of ethanol is refluxed for five hours and then concentrated to about 50 parts by volume. On cooling, a precipitate separates and is filtered off. Recrystallization from ethanol yields pure isomer I as the hydrochloride, melting point 238°–242° C.

The alcoholic filtrate from the first filtration is concentrated until the solvent is removed and is then triturated with ether. The precipitate which separates is filtered off and treated with aqueous ammonium hydroxide. The white crystals are separated and recrystallized from hexane. The pure isomer II base melts at 75°–76° C. When treated with alcoholic hydrogen chloride, isomer II hydrochloride, melting point 208°–210° C., is obtained.

EXAMPLE 3

*1-(2,4-dichlorophenyl)-3(and 5)-methyl-5(and 3)-(4-pyridyl)-pyrazoles*

A mixture of 16.4 parts of isonicotinoylacetone, 21.4 parts of 2,4-dichlorophenylhydrazine hydrochloride, and 80 parts of ethanol is refluxed for seven hours and then cooled. The precipitate is filtered off and recrystallized from ethanol. The product, isomer I hydrochloride, melts at 244°–249° C. When this material is treated with aqueous ammonia, isomer I free base is obtained, melting point 133°–134° C.

The ethanolic filtrate from the first filtration is concentrated to dryness and the residue is treated with aqueous ammonia. The precipitate is separated and recrystallized from ethanol until pure isomer II free base is obtained, melting point 135°–136° C.

The melting point of the mixture of the two bases is 105°–115° C.

EXAMPLE 4

*1-(5-chloro-2-methoxyphenyl)-3(and 5)-methyl-5(and 3)-(4-pyridyl)-pyrazoles*

These products are prepared by reacting isonicotinoylacetone with 5-chloro-2-methoxyphenylhydrazine hydrochloride and separating the isomers as described in Example 3. It is necessary to concentrate the reaction mixture in order to effect the separation of isomer I hydrochloride. Isomer I free base melts at 158°–159° C. Isomer II free base melts at 140°–141° C. A mixture of the free bases melts at 118°–123° C.

EXAMPLE 5

*1-(3-chloro-2-methylphenyl)-3(and 5)-methyl-5(and 3)-(4-pyridyl)-pyrazoles*

A mixture of 16.4 parts of isonicotinoylacetone, 19.4 parts of 3-chloro-2-methylphenylhydrazine hydrochloride, and 80 parts of ethanol is refluxed for seven hours. The reaction mixture is concentrated to a syrup, triturated with ether and then filtered. The solid is recrystallized from 60 parts of ethanol. A second recrystallization yields pure isomer I hydrochloride, melting point 284°–290° C.

Crude isomer II hydrochloride is obtained when the filtrate from the first ethanol recrystallization is concentrated. Recrystallization twice from ethanol results in pure isomer II hydrochloride, melting point 213°–215° C.

EXAMPLE 6

*1-(p-bromophenyl)-3-(or 5)-methyl-5(or 3)-(4-pyridyl)-pyrazole hydrochloride and free base*

A mixture of 23.5 parts of p-bromophenylhydrazine hydrochloride, 16.4 parts of isonicotinoylacetone, and 80 parts of ethanol is refluxed for two–seven hours and cooled. The precipitate which separates is filtered and recrystallized from ethanol. The yield of the hydrochloride, melting point 249°–253° C., is 47%. When the hydrochloride is treated with aqueous ammonia, the free base, melting point 124°–126° C., is obtained.

EXAMPLE 7

*1-(o-chlorophenyl)-3(or 5)-methyl-5(or 3)-(4-pyridyl)-pyrazole hydrochloride and free base*

These products are obtained by the same methods as described in Example 6, except that o-chlorophenylhydrazine hydrochloride is used in place of p-bromophenylhydrazine hydrochloride and the final reaction mixture is concentrated before the hydrochloride is separated. The hydrochloride melts at 227°–229° C., and the free base melts at 113°–114° C.

EXAMPLE 8

*1-(4-chloro-2-methylphenyl)-3(or 5)-methyl-5(or 3)-(4-pyridyl)-pyrazole hydrochloride*

This compound is obtained by the method described in Example 6, except that 4-chloro-2-methylphenylhydrazine hydrochloride is used in place of p-bromophenylhydrazine hydrochloride and the final reaction mixture is concentrated before the hydrochloride is separated. The hydrochloride melts at 218°–225° C.

EXAMPLE 9

*1-(2,5-dichlorophenyl)-3 (or 5)-methyl-5(or 3)-(4-pyridyl)-pyrazole and hydrochloride*

A mixture of 18.6 parts of 2,5-dichlorophenylhydrazine, 16.4 parts of isonicotinoylacetone and 80 parts of ethanol is refluxed for five hours and cooled and then filtered. The yield of product which melts at 132°–134° C. is 43%. The hydrochloride, melting point 246°–249° C. is obtained when the base is treated with alcoholic hydrogen chloride.

EXAMPLE 10

*1-(p-chlorophenyl)-3(or 5)-methyl-5(or 3)-(2-pyridyl)-pyrazole and hydrochloride*

These products are obtained by the same methods as described in Example 9, except that p-chlorophenylhydrazine is used in place of 2,5-dichlorophenylhydrazine and picolinoylacetone is used in place of isonicotinoylacetone. The yield of base, melting point 94°–96° C., is 74%. The hydrochloride melts at 187°–189° C.

EXAMPLE 11

*1-(p-chlorophenyl)-3(or 5)-methyl-5(or 3)-(3-pyridyl)-pyrazole hydrochloride*

A mixture of 4.9 parts of nicotinoyl acetone, 4.3 parts of p-chlorophenylhydrazine and 25 parts of ethanol is allowed to stand for 24 hours. One molar equivalent of ethanolic hydrogen chloride is added and the reaction mixture is heated at reflux for four hours and then cooled. Crystals separate and are recrystallized from ethanol. The pure hydrochloride is obtained in 50% yield and melts at 220°–223° C.

EXAMPLE 12

*1-(m-chlorophenyl)-3(or 5)-methyl-5(or 3)-(3-pyridyl)-pyrazole hydrochloride*

A mixture of 16.4 parts of nicotinoylacetone, 14.2 parts of m-chlorophenylhydrazine, and 80 parts of ethanol is allowed to stand for ten hours at room temperature and is then refluxed for six–twenty hours. The reaction mixture is distilled and the portion boiling at 156°–162° C. (0.2 mm.) is collected. The yield is 52%. When this material is treated with alcoholic hydrogen chloride, the hydrochloride, melting point 170°–172° C., is obtained.

EXAMPLE 13

*1-(m-chlorophenyl)-3(or 5)-methyl-5(or 3)-(2-pyridyl)-pyrazole hydrochloride*

This compound is prepared by the method described in Example 12, except that picolinoylacetone is substituted for nicotinoylacetone. The yield of base, boiling point 170°–173° C. (0.8 mm.), is 85%. The hydrochloride melts at 154°–156° C.

EXAMPLE 14

*1-(m-chlorophenyl)-3(or 5)-ethyl-5(or 3)-(4-pyridyl)-pyrazole hydrochloride*

This compound is prepared by the method described in Example 12, except that 1-(4-pyridyl)-1,3-pentanedione is substituted for the nicotinoylacetone. The yield of base, boiling point 166°–170° C. (0.3 mm.), is 78%. The hydrochloride melts at 207°–209° C.

EXAMPLE 15

*1-(p-chlorophenyl)-3(or 5)-ethyl-5(or 3)-(4-pyridyl)-pyrazole hydrochloride*

This compound is prepared by the method described in Example 14, except that p-chlorophenylhydrazine is used in place of m-chlorophenylhydrazine. The yield of base, boiling point 182°–186° C. (0.8 mm.), is 70%. The hydrochloride melts at 229°–232° C.

EXAMPLE 16

*1-(m-methoxyphenyl)-3(or 5)-methyl-5(or 3)-(3-pyridyl)-pyrazole*

This compound is prepared by the method described in Example 12, except that m-methoxyphenylhydrazine is used in place of the m-chlorophenylhydrazine. The yield of product, boiling point 165°–170° C. (0.5 mm.), is 72%.

EXAMPLE 17

*1-(m-methoxyphenyl)-3(or 5)-methyl-5(or 3)-(4-pyridyl)-pyrazole*

A mixture of 16.4 parts of isonicotinoylacetone, 13.8 parts of m-methoxyphenylhydrazine, and 240 parts of ethanol is refluxed for ten hours and then distilled. The yield of product, boiling point 170°–180° C. (1 mm.), is 72%.

EXAMPLE 18

*1(m-hydroxyphenyl)-3(or 5)-methyl-5(or 3)-(4-pyridyl)-pyrazole hydrobromide*

A solution of 2.5 parts of 1-(m-methoxyphenyl)-3(or 5)-methyl-5(or 3)-(4-pyridyl)-pyrazole in 25 parts by volume of 48% hydrogen bromide is heated on the steam bath for 24 hours and then concentrated to dryness. The residue is warmed with a little ethanol. On cooling, tan crystals separate. The precipitate is filtered off and recrystallized from ethanol. The pure white product melts at 250°–252° C.; yield, 42%.

We claim:

1. A compound selected from the group consisting of those having the general formulas:

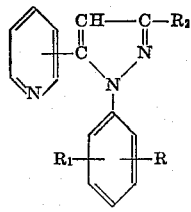

and

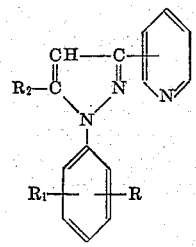

in which R is a member of the group consisting of halogen, hydroxyl, and lower alkoxy radicals, $R_1$ is a member of the group consisting of hydrogen, halogen, lower alkyl, and lower alkoxy radicals, and $R_2$ is a lower alkyl radical and acid addition salts thereof.

2. The compound 1-(m-chlorophenyl)-3-methyl-5-(3-pyridyl)-pyrazole.

3. The compound 1-(m-chlorophenyl)-5-methyl-3-(3-pyridyl)-pyrazole.

4. The compound 1-(m-chlorophenyl)-3-methyl-5-(4-pyridyl)-pyrazole.

5. The compound 1-(m-chlorophenyl)-5-methyl-3-(4-pyridyl)-pyrazole.

6. The compound 1-(p-chlorophenyl)-3-methyl-5-(4-pyridyl)-pyrazole.

7. A method of preparing a compound selected from the group having the general formulas:

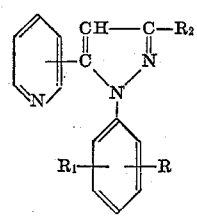

and

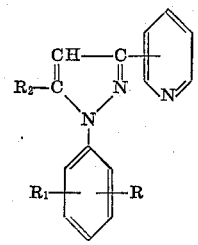

in which R is a member of the group consisting of halogen, hydroxyl, and lower alkoxy radicals, $R_1$ is a member of the group consisting of hydrogen, halogen, lower alkyl, and lower alkoxy radicals, and $R_2$ is a lower alkyl radical which comprises reacting a pyridyl beta-dicarbonyl compound having the formula:

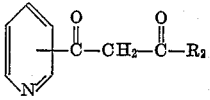

in which $R_2$ is as previously defined with a hydrazine compound having the formula:

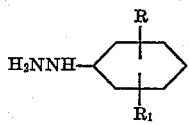

in which R and $R_1$ are as defined above.

8. A method of preparing 1-(m-chlorophenyl)-3-methyl-5-(3-pyridyl)-pyrazole which comprises reacting nicotinoylacetone with m-chlorophenylhydrazine and recovering said product therefrom.

9. A method of preparing 1-(m-chlorophenyl)-5-methyl-3-(3-pyridyl)-pyrazole which comprises reacting nicotinoylacetone with m-chlorophenylhydrazine and recovering said product therefrom.

10. A method of preparing 1-(m-chlorophenyl)-3-methyl-5-(4-pyridyl)-pyrazole which comprises reacting isonicotinoylacetone with m-chlorophenylhydrazine and recovering said product therefrom.

11. A method of preparing 1-(m-chlorophenyl)-5-methyl-3-(4-pyridyl)-pyrazole which comprises reacting isonicotinoylacetone with m-chlorophenylhydrazine and recovering said product therefrom.

12. A method of preparing 1-(p-chlorophenyl)-3-methyl-5-(4-pyridyl)-pyrazole which comprises reacting isonicotinoylacetone with p-chlorophenylhydrazine and recovering said product therefrom.

References Cited in the file of this patent

Davis: Chem. Abstracts, vol. 35, col. 5501 (1941).
Treibs et al.: Chem. Abstracts, vol. 47, cols. 3295–6 (1953).